Aug. 8, 1961 M. F. STERNER Re. 25,023

MEANS FOR STARTING AND OPERATING INTERNAL COMBUSTION ENGINES

Original Filed March 18, 1957 3 Sheets-Sheet 1

INVENTOR.
MELVIN F. STERNER
BY
Walter Patorska, Sr.
ATTORNEY

MEANS FOR STARTING AND OPERATING INTERNAL COMBUSTION ENGINES

Original Filed March 18, 1957 3 Sheets-Sheet 2

INVENTOR.
MELVIN F. STERNER
BY
Walter Patorska, Sr.
ATTORNEY

MEANS FOR STARTING AND OPERATING INTERNAL COMBUSTION ENGINES

Original Filed March 18, 1957 3 Sheets-Sheet 3

INVENTOR.
MELVIN F. STERNER
BY
Walter Patarabo, Jr.
ATTORNEY

United States Patent Office

Re. 25,023
Reissued Aug. 8, 1961

25,023

MEANS FOR STARTING AND OPERATING INTERNAL COMBUSTION ENGINES

Melvin F. Sterner, Bloomfield Hills, Mich., assignor to Holley Carburetor Company, Van Dyke, Mich., a corporation of Michigan Original No. 2,939,445, dated June 7, 1960, Ser. No. 646,909, Mar. 18, 1957. Application for reissue July 12, 1960, Ser. No. 42,456
16 Claims. (Cl. 123—119)

Matter enclosed in heavy brackets [ ] appears in the original patent but forms no part of this reissue specification; matter printed in italics indicates the additions made by reissue.

This invention relates to internal combustion engines, and more particularly to means for controlling the starting and subsequent warm-up period operation thereof.

Most internal combustion engines and particularly those employed to drive motor vehicles are now equipped with a so-called automatic choke, the main purpose of which is to provide a relatively rich fuel-air mixture for the engine on cold starting and until the engine has reached normal operating temperature. The most common type of automatic choke is that having an off-set choke plate, a vacuum piston responsive to engine vacuum for opening the choke plate and a single thermostatic coil spring to resist such opening, with the resistance thereof decreasing with increasing engine temperature.

However, there are still some objections to the use of the above type automatic choke. In the first place, the use of a single thermostatic coil spring opposing a vacuum piston tends to limit the calibration of the choke to engine requirements; that is, with any given piston and single spring combination, certain compromises have to be made which may result in departures from exact engine requirements. Secondly, the vacuum piston is a relatively expensive part of the choke assembly, and it is subject to malfunctions such as sticking.

The latter objections are related in that it is common practice to provide a predetermined bleed around the piston so that engine vacuum can also draw air heated by a stove in the exhaust manifold into the thermostatic coil spring housing as an indication of engine operating temperature. A separate clean air line must, nevertheless, be provided between the inside of the air cleaner and the stove to prevent air-borne dirt from causing the piston to stick. Also, great care must be taken to prevent and repair exhaust leaks at the stove, since this will very quickly cause the piston to stick and malfunction. This sticking sometimes occurs despite these precautions.

It is now proposed to provide an automatic choke assembly in which there is no vacuum piston and in which there is not merely one but a combination of at least two thermostatic coil springs. With the use of the spring combinations contemplated by the invention, a choke mechanism may be provided that functions just as well as or better than a choke having a vacuum piston and without the above objections of a piston.

The invention will be best understood from the following detailed description and claims, reference being had to the accompanying drawings in which one embodiment of the invention is shown by way of example and wherein:

Figure 1:
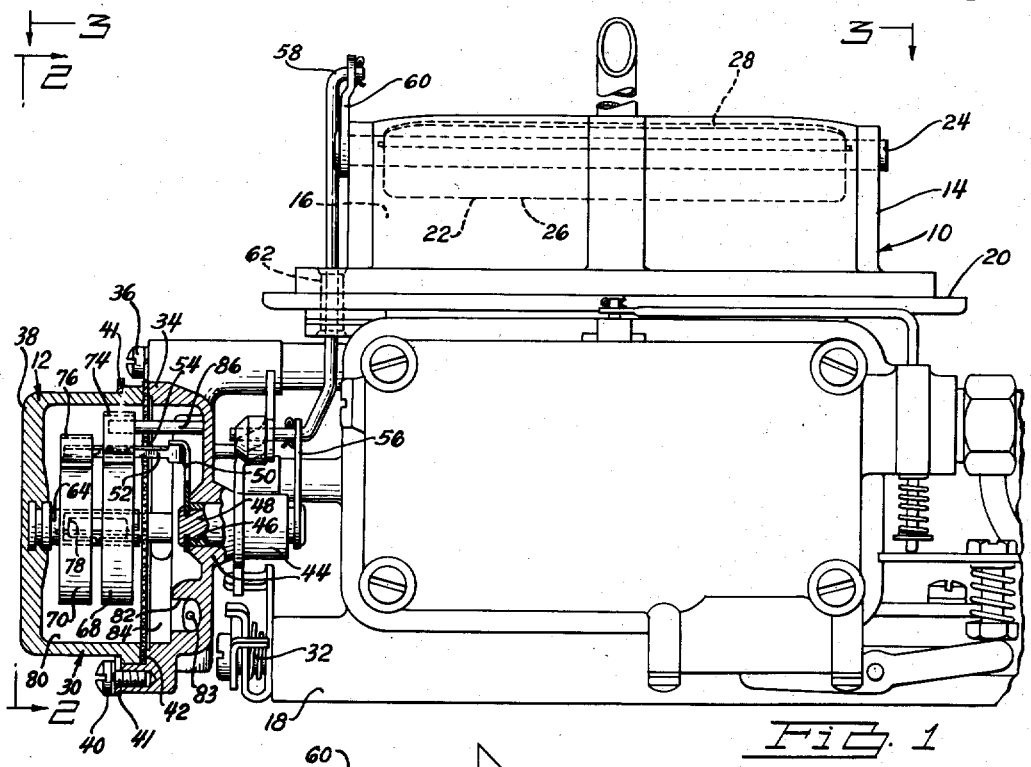
FIGURE 1 is a side elevational view, with portions thereof cut away and in cross section, illustrating a carburetor having an automatic choke embodying the invention.

Referring to the drawings in greater detail, FIGURES 1–4 illustrate an automotive carburetor 10 having an automatic choke 12 embodying one modification of the invention. This carburetor, which will be described in detail only to the extent necessary to disclose the invention, includes an upper section 14 having an air intake passage 16 to supply combustion air to the lower throttle body portion 18. The usual air cleaner would be fitted to the flange 20 so that clean air would be supplied to the engine.

Figure 2:
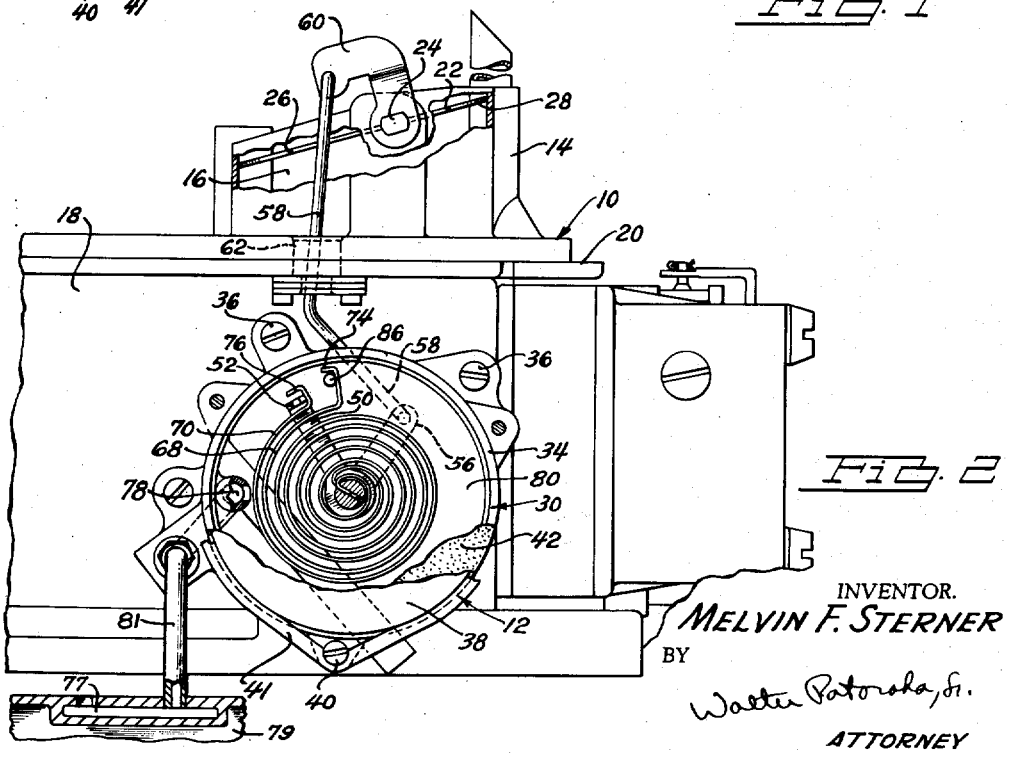
FIGURE 2 is a fragmentary end elevational view, with portions thereof cut away and in cross-section, taken on the plane of line 2—2 of FIGURE 1 and looking in the direction of the arrows.
Figure 3:
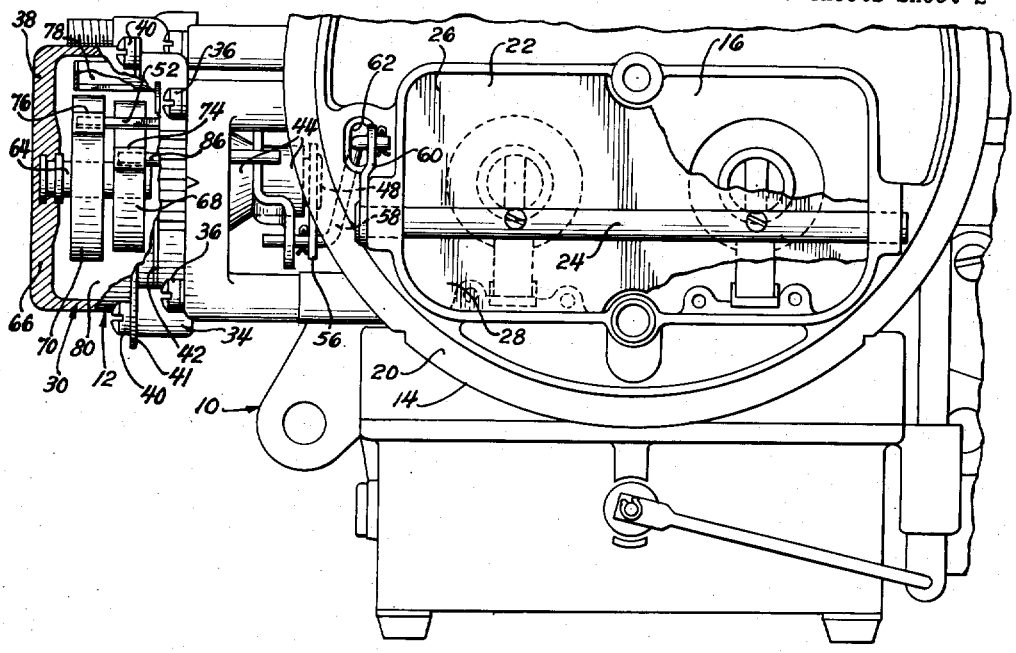
FIGURE 3 is a fragmentary top plan view with portions thereof cut away and in cross-section, taken on the plane of line 3—3 of FIGURE 1 and looking in the direction of the arrows.
Figure 4:
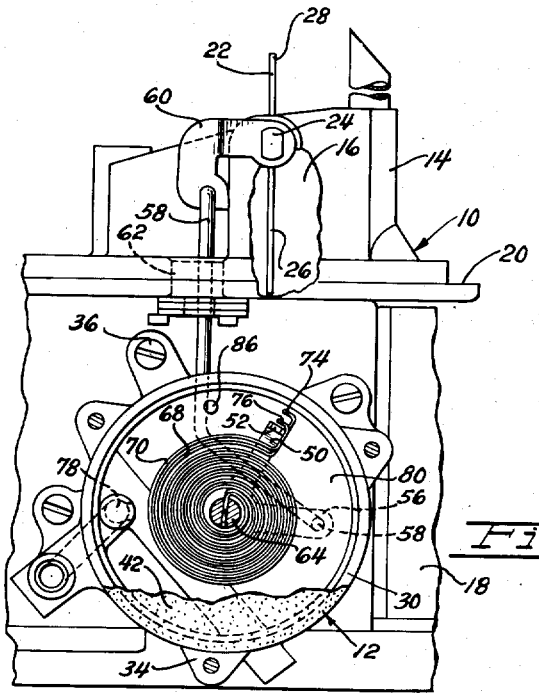
FIGURE 4 is a view similar to FIGURE 2 illustrating the embodiment of the invention shown by FIGURES 1–3, but with the choke open.
Figure 5:
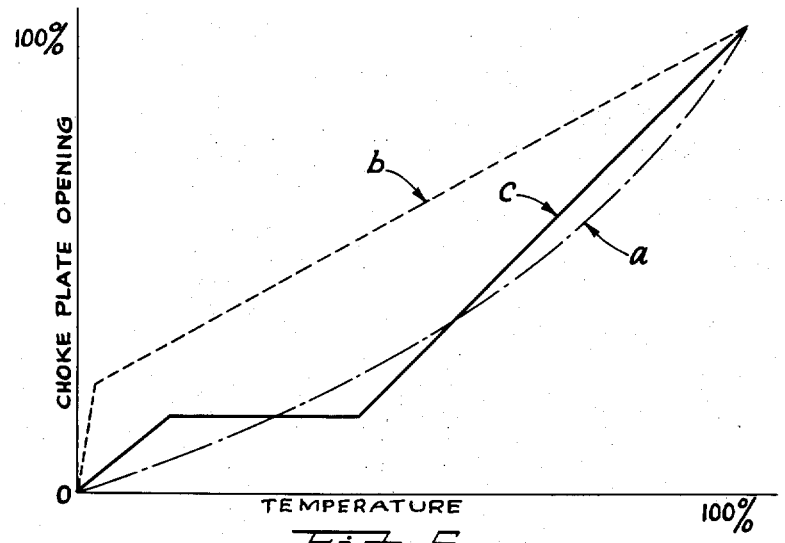
FIGURES 5 and 6 illustrate qualitative performance curves of the automatic choke shown by FIGURES 1–4, as compared to that of present automatic chokes having a single spring and a vacuum piston. These curves also illustrate that the performance curves of an automatic choke embodying the invention approximate more closely the desired curves for a given engine than do the curves of present chokes.

A choke valve or plate 22 for controlling the flow of air through the passage 16 is mounted on the pivot shaft 24 in a manner so that the plate is offset on the pivot; that is, the lower or downstream portion 26 of the plate, when the plate is fully closed as shown by FIGURES 1–3, is substantially longer than the upper or upstream portion 28 so that when the engine is started the flow of air through the passage 16 will tend to open the plate 22 as shown by FIGURES 4 and 5. Furthermore, the unbalance is also such that if there were nothing to restrain it, the choke plate would fully open due to gravity.

The lower throttle body portion 18 contains or has mounted thereon the usual carburetor structures, such as the primary and/or the secondary induction passages each having a venturi, the associated throttle plates and throttle shafts, the float chambers, the fast idle mechanism, the accelerating pump, etc. Since these structures are not important to the invention, they need not be shown and/or described in detail.

Referring again to FIGURES 1–4, an automatic choke housing assembly 30 may be secured to the side of the throttle body portion 18, preferably adjacent the end 32 of the prlmary throttle shaft. The assembly 30 includes a cast or other hollow housing 34 secured to the throttle body 18 by any suitable means such as screws 36. A plastic or other insulating type cover 38 secured by screws 40 and a clamping ring 41 and a separating gasket 42 constructed from a material having heat insulating properties.

The housing 34 is provided with a journal 44 and bearing 46 adapted to receive the shaft 48 which is free to rotate within the bearing 46. A lever 50 having a laterally etxending portion 52 is secured for rotation with the shaft 48 and within the housing 34 and the cover 38, with the portion 52 being adapted to move along the arcuate slot 54 in the gasket 42. The other end of the shaft 48 is provided with a lever 56 which is also secured for rotation with the shaft 48, and a suitable link 58 is pivoted at the ends thereof between the lever 56 and the lever 60 which is secured for rotation with the choke shaft 24. The link 58 may extend through a suitable opening 62 in the air cleaner flange 20.

The cover 38, which is preferably constructed from a heat insulating material, comprises a hollow body of suitable proportions to house the structure to be described; it includes a stem 64 rigidly secured to the center of the end wall 66. The stem 64 is of sufficient length to accommodate the thermostatic coil springs 68 and 70, the inner ends of which are preferably received and anchored in the slot 72 in the stem 64. The outer ends 74 and 76 of the springs 68 and 70, respectively, are formed to provide radially extending hook-like abutments adapted to be engaged by the laterally extending portion 52 of the lever 50 when the lever rotates with the shaft 48.

Provision may be made, as is well known in the art, to heat the coil springs 68 and 70 by air heated in any suitable manner by the exhaust manifold, as an indication of engine operating temperature. For instance, the heated air may be drawn from a stove 77 in the exhaust manifold 79 through conduit 81 and passage 78 and into the thermostatic spring chamber 80 defined by the insulating gasket 42 and cover 38 at a predetermined rate by means of a passage 82 having a restriction 83 and leading from the chamber 84 to a source of engine intake manifold vacuum; communication between chamber 80 and the chamber 84 may be provided by the arcuate slot 54 in the insulating gasket 42.

In FIGURES 1–3, the choke plate 22, the choke housing assembly 30 and the connecting linkage 58 are shown in the position they would be when the engine is cold and not operating; that is, the thermostatic coil springs 68 and 70 are unwound so that the abutment 76 of outer spring 70 engages the portion 52 of lever 50 and urges the lever 50 to the left, as shown in FIGURE 3, to raise the link 58 and close the offset choke plate 22 against the force of gravity tending to open it. The inner coil spring 68 is prevented from completely unwinding by the engagement of the abutment 74 with the pin 86 extending outwardly from the housing 34.

As soon as the cold engine starts after cranking, the flow of air to the engine past the throttle valve, which may be held in the partially opened position by any suitable fast idle mechanism, exerts an additional opening force on the unbalanced choke plate 22. This additional opening force is first decreasingly opposed by the thermostatic spring 70, which winds up as the engine warms up until its abutment 74 lines up with the abutment 76 of preloaded thermostatic spring 70, at which time both thermostatic coil springs 68 and 70 will decreasingly oppose the further opening of the choke plate 22 with increasing engine temperature until normal engine temperature is reached and the choke plate 22 is fully opened, as shown by FIGURE 4.

When the engine is shut down and the coil springs 68 and 70 begin to cool, they both unwind to urge the choke plate 22 closed and finally assume their original positions shown by FIGURE 2 or some interemediate positions depending upon their temperature and thermal characteristics, unless such closing is interrupted by the fast idle mechanism. In the latter event, such positions will be assumed the next time the throttle valve is opened, as it usually is on starting.

Should the engine stall after starting, the coil spring 70 and/or the coil spring 68, depending upon the temperature at the time of stalling, will urge the choke plate 22 back to a more closed position to enrich the mixture.

Figure 6:
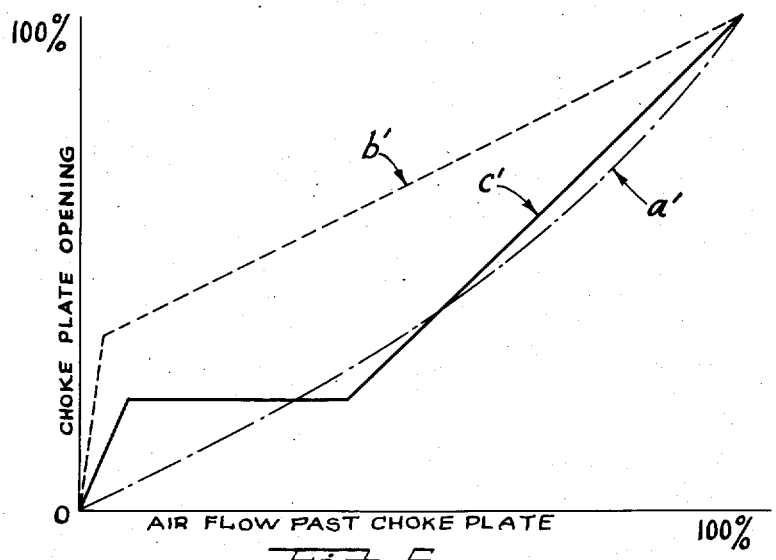

FIGURES 5 and 6 illustrate qualitative performance curves of choke plate opening vs. temperature and air flow plast choke plate, respectively. Curves a and a′ illustrate the ideal or required curves for a particular engine; curves b and b′ illustrate the curve obtained with present choke mechanisms having a single thermostatic coil and a vacuum piston; curves c and c′ illustrate the curves obtained with a choke mechanism embodying the invention.

It is apparent, from FIGURES 5 and 6, that curves c and c′ are much closer to the required curves a and a′ than are curves b and b′. Thus, more flexibility is provided so that less compromise need be made in adjusting the choke to particular engine requirements. At the same time, the objections to the use of the usual vacuum piston have been eliminated.

While but one embodiment of the invention has been shown and described for the purpose of illustration, it is apparent that many modifications and adaptations may be made within the teachings of the invention. For example, any number of thermostatic springs of varying thermal characteristics may be employed, depending upon the particular engine requirements. One or more mechanical springs may be included in the spring combination, and one or more of the springs may have their abutments positioned so as to assist in opening the choke plate. Also, the dual or other thermostatic spring combinations may be employed with a vacuum piston, if one is found to be necessary in a particular case. Accordingly, no limitations are intended except those in the appended claims.

What I claim as my invention is:

1. In a carburetor or other fuel control having an air passage, a pivoted choke valve in said passage to control the flow of air, said choke valve being off-set on its pivot so that the flow of air through said passage and gravity provides the only forces to open said choke valve and having a laterally extending arm, means adapted to oppose the opening of said choke valve, said means comprising a pair of yieldable thermostatic coil springs having abutments at the outer free ends thereof adapted to be engaged by said arm, said abutments being circumferentially spaced so as to be engaged by said arm at different degrees of opening of said choke valve, one of said abutments being in contact with said arm when said choke valve is closed.

2. In a carburetor or other fuel control having an air passage, a pivoted choke valve in said passage to control the flow of air, said choke valve being off-set on its pivot so that the flow of air through said passage tends to open said choke valve and having a laterally extending arm, means adapted to oppose the opening of said choke valve by said flow of air, said means comprising a plurality of yieldable thermostatic elements being anchored at the inner ends thereof and formed to provide abutments at the outer free ends thereof adapted to be engaged by said arm, said abutments being spaced so as to be engaged by said arm at different degrees of opening of said choke valve, one of said abutments being in contact with said arm when said choke valve is closed.

3. In a carburetor or other fuel control having an air passage, a pivoted choke valve in said passage to control the flow of air, said choke valve being off-set on its pivot so that the flow of air through said passage tends to open said choke valve and said choke valve having an off-set laterally extending arm, means adapted to influence the opening of said choke valve, said means comprising a plurality of yieldable thermostatic elements having a common anchor for one of the inner ends thereof and formed to provide abutments at the free ends thereof adapted to be engaged by said arm, said abutments being circumferentially spaced so as to be engaged by said arm at different degrees of opening of said choke valve, one of said abutments being in contact with said arm when said choke valve is closed, one or more of said elements being preloaded by a stop to increase their initial resistance to opening of said thermostatic valve.

4. A carburetor having an air passage, a pivoted choke valve in said air passage, said choke valve being off-set on its pivot so that gravity and the air flow through said passage provide the only forces tending to open said choke valve, *an extending arm member operatively secured to said choke valve,* and means adapted to oppose the opening of said choke valve, said means comprising a pair of yieldable thermostatic coils having abutments at the outer free ends thereof adapted to be engaged by said arm, said abutments being circumferentially spaced so as to be engaged by said arm at different degrees of opening of said choke valve, one of said abutments being in contact with said arm when said choke valve is closed.

5. A carburetor having an air passage, a pivoted choke valve in said air passage, said choke valve being off-set on its pivot so that gravity and the air flow through said passage provide the only forces tending to open said choke valve, *an extending arm member operatively secured to said choke valve,* and means adapted to oppose the opening of said choke valve, said means comprising a pair of yieldable thermostatic coils having abutments at the outer free ends thereof adapted to be engaged by said arm.

6. A carburetor having an air passage, a pivoted choke valve in said air passage, said choke valve being off-set on its pivot so that the air flow through said passage provides the only force in addition to gravity tending to open said choke valve, *an extending arm member operatively secured to said choke valve,* and means adapted to influence the opening of said choke valve by such flow of air, said means comprising a plurality of yieldable thermostatic elements having an anchor for one of the ends thereof and formed to provide abutments at the free ends thereof adapted to be engaged by said arm, said abutments being circumferentially spaced so as to be engaged by said arm at different degrees of opening of said choke valve, at least one of said abutments being in contact with said arm when said choke valve is closed.

7. A carburetor having an air passage, a pivoted choke valve in said air passage, said choke valve being off-set on its pivot so that the air flow through said passage provides the only force in addition to gravity tending to open said choke valve, *an extending arm member operatively secured to said choke valve,* and means adapted to oppose the opening of said choke valve by such flow of air, said means comprising a plurality of yieldable thermostatic elements having an anchor for the inner ends thereof and formed to provide abutments at the outer free ends thereof adapted to be engaged by said arm, said abutments being circumferentially spaced so as to be engaged by said arm at different degrees of opening of said choke valve, one of said abutments being in contact with said arm when said choke valve is closed, and at least one of said elements being preloaded to increase their initial resistance to opening of said thermostatic valve.

8. A carburetor or other fuel control for an internal combustion engine, comprising a body formed to provide an air intake passage, a pivoted choke valve disposed in said passage to control the flow of air therethrough, said valve being offset on its pivot so that the flow of air through said passage provides a relatively strong and the only force in addition to gravity tending to open said valve, and means connected to said valve by suitable linkage for controlling the opening and closing of said valve according to engine temperature, said means including a housing adapted to be heated by said engine, at least two separate thermostatic coil springs disposed in said housing, said coil springs being anchored at their inner ends to said housing and presenting at their outer ends circumferentially spaced abutments adapted to be engaged by said linkage on different angular positions of said choke valve, said coil springs providing forces opposing in stages the opening movement of said choke valve, one or more of said forces diminishing with increase in engine temperature, said linkage and said abutments being constructed so that they are not interlocked.

9. A carburetor or other fuel control for an internal combustion engine, comprising a body formed to provide an air intake passage, a pivoted choke valve disposed in said passage to control the flow of air therethrough, said valve being offset on its pivot so that the flow of air through said passage provides a relatively strong and the only force in addition to gravity tending to open said valve, and means cooperating with suitable linkage connected to said valve for controlling the opening and closing of said valve, said means including a housing adapted to be heated by said engine, at least two separate thermostatic springs disposed in said housing, said springs being anchored at one of their ends to said housing and presenting at the other of their ends spaced abutments adapted to be engaged by said linkage on different positions of said choke valve, said springs providing forces opposing in stages the opening movement of said choke valve, one or more of said forces diminishing with increase in engine temperature.

10. A carburetor or other fuel control for an internal combustion engine, comprising a body formed to provide an air intake passage, a pivoted choke valve disposed in said passage to control the flow of air therethrough, said valve being offset on its pivot so that gravity and the flow of air through said passage provide relatively strong and the only forces tending to open said valve, and means connected to said valve by suitable linkage for controlling the opening and closing of said valve according to engine temperature, said means including a housing adapted to be heated by said engine, a plurality of separate thermostatic coil springs of varying thermal characteristics disposed in said housing, said coil springs being anchored at their inner ends to said housing and presenting at their outer ends abutments adapted to be engaged by said linkage, said coil springs providing forces opposing in varying degrees dependent upon engine temperature the opening movement of said choke valve.

11. A carburetor or other fuel control for an internal combustion engine, comprising a body formed to provide an air intake passage, a pivoted choke valve disposed in said passage to control the flow of air therethrough, said valve being offset on its pivot so that the flow of air through said passage creates a force tending to open said valve, and means connected to said valve by suitable linkage for controlling the opening and closing of said valve according to engine temperature and independently of engine vacuum, said means including a housing adapted to be heated by said engine, at least two separate coil springs disposed in said housing, said coil springs being anchored at their inner ends to said housing and presenting at their outer ends circumferentially spaced abutments adapted to be engaged by said linkage on different angular positions of said choke valve, some of said coil springs providing initial forces opposing the opening movement of said choke valve, others of said coil springs providing subsequent forces opposing the opening of said choke valve one or more of said forces varying with changes in engine temperature.

12. A carburetor or other fuel control for an internal combustion engine, comprising a body formed to provide an air intake passage, a pivoted choke valve disposed in said passage to control the flow of air therethrough, said valve being off-set on its pivot so that the flow of air through said passage provides a force tending to open said valve, and means connected to said valve by suitable linkage for controlling the opening and closing of said valve according to engine temperature, said means including a housing adapted to be heated by said engine, at least two separate coil springs disposed in said housing, said coil springs being anchored at their inner ends to said housing and presenting at their outer ends spaced abutments adapted to be engaged by said linkage on different annular positions of said choke valve, one or more of said coil springs being a thermostatic spring providing forces opposing the opening movement of said choke valve and one or more of said forces varying with changes in engine temperature.

13. A carburetor or other fuel control for an internal combustion engine, comprising a body formed to provide an air intake passage, a pivoted choke valve disposed in said passage to control the flow of air therethrough, said valve being off-set on its pivot so that the flow of air through said passage provides a force tending to open said valve, and means connected by suitable linkage to said valve for controlling the opening and closing of said valve according to engine temperature, said means including a housing adapted to be heated by said engine, at least two separate coil springs disposed in said housing, said coil springs being anchored at their inner ends to said housing and presenting at their outer ends abutments adapted to be engaged by said linkage on different angular positions of said choke valve, said coil springs providing forces influencing the opening movement of said choke valve.

14. A carburetor or other fuel control for an internal combustion engine, comprising a body formed to provide an air intake passage, a pivoted choke valve disposed in said passage to control the flow of air therethrough, said valve being off-set on its pivot so that the flow of air through said passage provides the only force in addition to gravity tending to open said valve, and means connected by suitable linkage to said valve for controlling the opening and closing of said valve according to engine temperature, said means including a housing adapted to be heated by said engine, and at least two separate springs disposed in said housing, one or more of said springs being thermostatic springs, said springs being anchored at one of their inner ends to said housing and presenting at their other ends spaced abutments adapted to be engaged by said linkage on different positions of said choke valve, said springs providing forces opposing in varying stages and intensities, the opening movement of said choke valve.

15. A carburetor or other fuel control for an internal combustion engine, comprising a body having an air intake passage, a pivoted choke valve in said passage, said valve being offset so that flow of air and gravity provide the only forces to open said valve, and means influencing the opening of said valve including a pair of springs, at least one of said springs being responsive to engine temperature so as to regulate choke opening in accordance with engine temperature and the other of said springs comprising means for varying the regulation of said choke valve by said thermostatic spring *only after said choke valve has opened a predetermined amount.*

16. A carburetor or other fuel control for an internal combustion engine, comprising a body having an air intake passage, a pivoted choke valve in said passage, said valve being offset so that flow of air and gravity provide the only forces to open said valve, and means influencing the opening of said valve including a plurality of springs, at least one of said springs being responsive to engine temperature so as to regulate choke opening in accordance with engine temperature and the other of said springs being arranged so as to vary the regulation of said choke valve by said thermostatic spring *only after said choke valve has opened a predetermined amount.*

References Cited in the file of this patent or the original patent

UNITED STATES PATENTS

| | | |
|---|---|---|
| 2,694,559 | Gordon et al. | Nov. 16, 1954 |
| 2,705,484 | Jorgensen et al. | Apr. 5, 1955 |
| 2,746,439 | Hunt | May 22, 1956 |